United States Patent Office 3,525,446
Patented Aug. 25, 1970

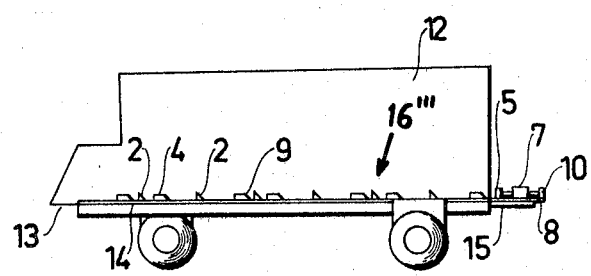
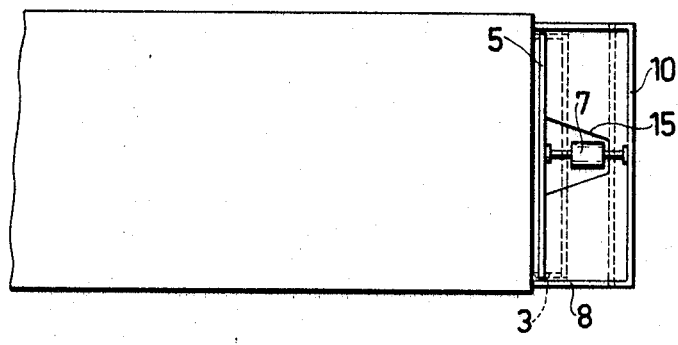

3,525,446
CONVEYOR FOR PARTICULATE MATERIAL
Stig Olof Grafstrom, Bondsjo, Sweden, assignor to Mo Och Domsjo Aktiebolag Ornskoldsvik, Sweden, a corporation of Sweden
Filed Nov. 15, 1968, Ser. No. 776,101
Claims priority, application Sweden, Nov. 15, 1967, 15,703/67
Int. Cl. B65g 25/08
U.S. Cl. 214—83.3
10 Claims

ABSTRACT OF THE DISCLOSURE

A conveyor for moving particulate material from one place to another is provided, having a generally flat conveyor support, and, arranged on the conveyor, two arrays of transport members each reciprocable in one direction to advance and push the particulate material forward along the conveyor, and in the other direction to slide beneath the particulate material so that the particulate material moves along the support only in one direction. The reciprocation of the two arrays of transport members is synchronized such that when one array moves in one direction, the other array moves in the opposite direction. Retaining members are also provided along the conveyor, to hold the particulate material against movement with the transport members while they are slipping beneath the material during their return reciprocation.

---

This invention relates to a conveyor for moving particulate material such as wood chips, wood shavings, pieces of bark, powders, granular materials and the like from one place to another, and comprises a conveyor support and an array of reciprocable transport members for pushing the particulate material along the support only in one direction. The invention is particularly suited for unloading such material from stationary and movable storage areas such as from a warehouse, ship, truck, railway car, or the like.

Vacuum conveying systems and bucket cranes are known apparatus for moving particulate material from stationary storage areas and ships. The vacuum conveying system is normally located outside of the storage area, whereas the bucket crane can be located either inside or outside of the storage area. These unloading apparatus have several disadvantages. For example, as the particulate material is unloaded and the amount of particulate material in the storage area is reduced, the mouth of the vacuum system or end of the bucket of the crane must be moved to pursue the diminishing amount of remaining material. Thus, it is necessary to make the unloading apparatus adjustable so that it can be moved from point to point, which complicates the structure, and requires manual labor. Moreover, these apparatus have relatively low capacity, prolonging loading time.

In the case of transport vehicles, such as trucks and railway cars, particulate material can be unloaded by tipping either at the rear or at the side. The tipping mechanism can be a part of the vehicle itself, or it can be separate from the vehicle. In either case, a receptacle such as bins or buckets is needed to receive the material, for further transport.

If space permits, the storage area can be hopperlike, with an inclined bottom, feeding to a conveyor belt or other form of conveyor. Gravity then causes the particulate material to slide onto the conveyor, whence it is conveyed from the storage space. However, if a slope is provided at the bottom of the storage area, the space beneath the bottom is wasted.

This invention overcomes the disadvantages of the known apparatus described above, and provides an apparatus for unloading particulate material from any storage area, whether stationary or mobile and regardless of shape. Operation is automatic, and thus a minimum of manual labor is needed. The material can be unloaded from the storage area directly onto a transport vehicle, onto a conveyor, or into apparatus for further processing.

The conveyor of the invention comprises, in combination, a stationary conveyor support; a first array of reciprocable transport members on the conveyor support, reciprocable in a direction to advance a layer of particulate material along the support and to slip through the layer in the opposite direction, the transport members having at least three sides, and having a generally vertical surface at an angle of at least 45° to the plane of the support, for pushing a layer of particulate material along the support, and having an inclined surface at an angle of less than 45° to the plane of the support, to slip through the layer of particulate material, and an interleaved second array reciprocable transport members along the support mounted for reciprocable movement opposite to the first array such that when the first array of transport members is slipping through the layer, the second array is advancing the layer.

The conveyor of the invention has a conveyor support, two arrays of reciprocable transport members that are movable oppositely reciprocably along the surface of the support, and can also have an array of fixed retaining members along the surface of the support.

The transport members are polygonal in cross-section, and have an approximately vertical surface facing in the direction in which particulate material on the support is to be moved, and an inclined surface facing in the opposite direction.

The vertical surface is at an angle of at least 45° to the plane of the support, and is preferably perpendicular ±5° to that plane, but it can also be at an angle greater than 90° up to approximately 120°, to that plane. Accordingly, when the transport member is moved with that surface and thrust against the particulate material, the material is pushed with the transport member, and so advanced along the surface of the support.

The inclined surface is at an angle of less than 45° to the plane of the support, and preferably less than 30° to that plane. When the transport member is moved with that surface thrust against the particulate material, the material is lifted up along that surface, to the apex of the transport member, and down the other side, so that the transport member in effect slips through the particulate material. There may nonetheless be some tendency of the particulate material to be carried on the inclined surface in the direction in which the member is moving. This can be counteracted by providing retaining members on the conveyor to hold the particulate material against such movement, and by the two interleaved separately reciprocable arrays of transport members, arranged for one to move in one direction while the other is moving in the opposite direction.

The conveyor support is stationary and is preferably flat, but it can have a convex or concave surface, or undulating surface, for drainage of fluids, or for other purposes. Any relatively smooth surface configuration which permits the particulate material to be pushed therealong can be employed. The support can be fixed to the floor or bottom of the storage area or container, or itself can comprise the floor of a storage area or container.

The arrays of transport members are positioned crosswise of the support and is mounted for reciprocating movement back and forth along the surface of the support. The transport members have a bottom surface shaped to match the flat, convex or concave contour of the conveyor with a bottom clearance sufficient to permit reciprocation without friction, but less than the diameter of the smallest particle of particulate material, so that it does not jam.

The vertical and inclined surfaces of the transport members are preferably flat, but they can also be convex or concave, or hemispherical. The vertical surface is so shaped and at such an angle to the support that it pushes the particulate material, and it is high enough so that substantially no material is pushed up and over it as it proceeds. The inclined surface is so shaped and at such an angle to the support that it does not push the particulate material, but instead the material slides along the surface and over the top of the transport member. As indicated above, the vertical surface thus is at an angle of more than 45° and preferably approximately 90°, while the inclined surface is at an angle of less than 45° and preferably less than 30°, to the plane of the support.

The support can be provided with sides which retain the load of particulate material on the conveyor surface and prevent it from falling off the sides, or rear. The sides can be positioned adjacent the reciprocation mechanism described below and can comprise the walls of storage area. For example, if the instant apparatus is positioned in a truck the sides of the truck can comprise the sides of the conveyor support.

The means for reciprocating the transport members along the support preferably comprises a slide mechanism which can be mounted along each side of the support or down the center of the support, in a recess provided therefor. A beam or slide member is fixed to the bottoms of the transport members, and extends longitudinally of the support. The beam or slide member can run on wheels in a guide or track, extending from end to end of the support. The slide member can be reciprocated by a drive mechanism, such as a piston-operated hydraulic drive which engages an end cross piece linking the slide members. The slide can be two beams or slide members mounted at the sides of the plate, or at the center, or a single slide member mounted at the center.

Other mechanisms for reciprocating the transport members along the surface of the support can be employed. One such alternative mechanism could be a rack and pinion gear drive, or a belt and pulley drive. A parallel shaft drive mechanism is also suitable. However, the slide mechanism described above is preferred.

Each of the two interleaved arrays of transport members provided, as described below, can be reciprocated by means of its own drive mechanism. Each array is preferably reciprocated in opposed synchronization to the other, such that when one is moved forwardly, the other is moved rearwardly and by the time the one array has completed its forward movement, the other has returned to a position where it is ready to begin its forward movement. The transport members of each array are interleaved with the transport members of the other array and spaced from each other a distance that is equal to the limit of the reciprocation of each member of the array so that no interference between the transport members occurs.

The opposite reciprocable movement of the two arrays aids in uniformily moving the particulate material forward on the surface of the support. While one array is moving the material forwardly along the support, the other array moves rearwardly. The simultaneous forward movement of the first array overcomes any tendency of the particulate material to move rearwardly, and since one aray is always moving forwardly, a generally uniform forward feed is obtained.

The support can also have a plurality of interleaved cross-strips fixed to the support at spacings approximately equal to the limits of reciprocation of the transport members. The cross strips are preferably positioned along the support such that the transport members of each set are separated from the adjacent transport members by a cross strip on the support and are spaced along the support at positions which correspond to the end of the travel of the transport members on the support. In this manner, each of the transport members reciprocates between cross strips. The cross strips are also provided with approximately vertical and inclined surfaces which are preferably the same as those of the transport members. The vertical surface of the cross strip acts as a barrier which resists any movement of the particulate material upon return reciprocation of the transport members. The sloping surfaces of the cross strips permit the particulate material to be pushed by the transport members in the forward direction over the cross strips. Thus, it can be appreciated that upon return reciprocation of one of the sets of transport members no movement of the particulate material results due to the slope of the surfaces of the transport members and the resistance to rearward movement provided by the vertical surfaces of the other set of transport members and the cross strips. The apparatus of the invention need not include both two sets of transport members and cross strips. Even if no cross strips are provided, the two sets of transporting members provide resistance to rearward movement of the material. As indicated, in the preferred construction of the instant invention both two sets of pusher members of the type described above are provided as well as cross strips on the support. In this construction uniform feeding of the particulate material on the support is obtained. The rate of discharge of the particulate material from the unloading apparatus will be generally uniform due to this construction and an increased conveying capacity is obtained as compared to a system having a single slide. Furthermore, operation of the apparatus can be almost completely automatic since all that is required is that the hydraulic motor be connected to a power source and turned on. These features are of particular importance when for example the goods are wood chips which are passed directly to plants for processing.

Th conveyor of the invention can be conviently used with a horizontal conveyor onto which the particulate material is discharged. This additional conveyor can run in the same direction as the conveyor of the invention at right angles thereto, or at any desired angle in between. A conveyor which is a vertical conveyor can also be used in combination with the conveyor of this invention.

Since the capacity of the instant unloading apparatus is high, a ship can be unloaded in a relatively short period of time and therefore, the time for which the ship must remain at dock side is reduced to a minimum. There is very little manual work required to operate the instant unloading apparatus and the instant unloading apparatus can be positioned completely within the storage area and need not have any external support or structure. Little space is required by the instant apparatus as compared to conveyor belts or storage spaces having sloping bottoms. When the instant unloading apparatus is employed in a truck or railway car, the transport members are arranged so that they extend across the vehicle and convey the goods toward the discharge end at the shorter side of the storage space in the vehicle and at the same level as the storage space. Thus, the particulate material can be unloaded from the cargo space of the vehicle completely and automatically without supervision. Similarly, the material can be transferred directly to a receiving conveyor from the instant conveyor. It is also relatively simple to vary the rate at which the material is unloaded with this invention since all that is necessary is to vary the speed at which the transport members are reciprocated. The power source for operating the instant apparatus can be located on the vehicle or can be a part of the receiving station.

In the drawings:

FIG. 6 is a schematic view of a trailer having a conveyor of the instant invention.

FIG. 7 is a top view of on an enlarged scale of the trailer shown in FIG. 6.

Figure 1:
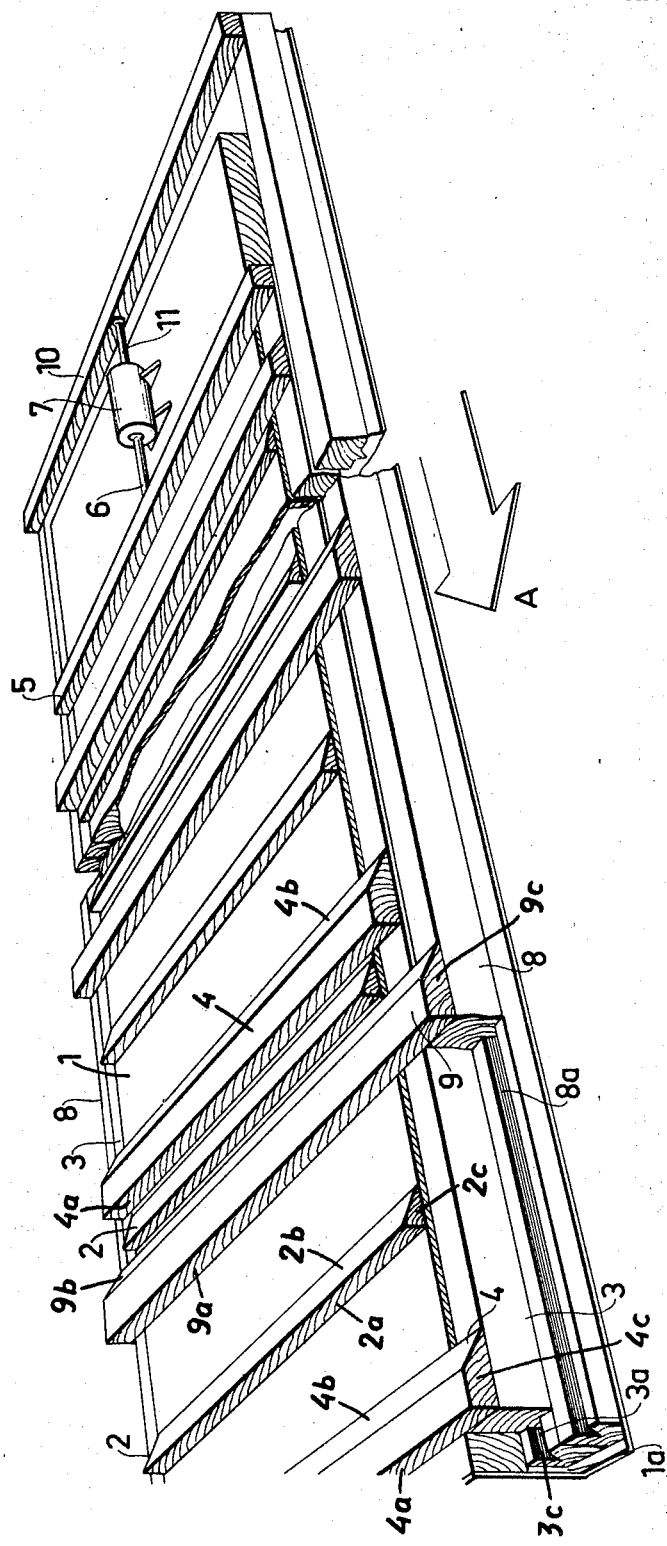
FIG. 1 is a view in perspective and partly broken away of the conveyor of this invention.

The embodiment of the invention shown in FIG. 1 comprises a particulate material support in the form of an elongated flat metal plate 1. Each of the long sides of the plate 1 is bent downwardly and outwardly at its external periphery to define an L-shaped angular chute 1a running the length of each side. An array of cross strips 2 which serve as retaining members are fixed in spaced positions along the surface of the plate 1. These strips are evenly spaced on the plate and are disposed generally perpendicularly to the sides of the plate. The strips are right triangles in cross section and are positioned with base of the right triangle abutting the surface of the plate, with the shortest side extending perpendicularly from the surface of the plate and facing in the forward direction, as defined by the arrow A. The rear side defines a sloping surface 2b at an angle of about 30° to the plate 1. The particulate material is pushed over this surface by the transport members in their forward movement. The surface 2b is smooth, and provides little resistance to sliding movement of the material. The vertical surface 2a defines a barrier which impedes rearward movement of the particulate material when the transport members are moving rearwardly. Along each side of the plate 1 is a slide beam 3 of which a bottom tongue 3c moves in a track guide 3a. The beam 3 is reciprocable in the track relative to the plate. The guides 3a are fixed in position in each chute 1a. The slide beams 3 on each side of the plate are interconnected by transport members 4, which extend across the plate 1 parallel to the strips 2. The transport members 4 are generally trapezoidal in cross section. The vertical side 4a of the transport member 4 is perpendicular to the surface of the support plate 1 and defines a pusher surface 4a for advancing the particulate material forward along the support 1. This surface 4a faces in the direction of the arrow A. The opposite side 4b of the transport member is inclined to the surface of the support at a 30° angle. Thus upon rearward movement the transport member 4 slides beneath the particulate material on the support plate, without tending to move the material rearwardly to anly significant extent. The pottom side 4a of the transport members 4 faces the surface of the plate 1, with a small clearance so that the transport members 4 reciprocate without friction along the plate 1. A second array of transport members is mounted on a second set of slides 8, reciprocably movable in guides 8a, positioned just outside of the guides 3a and within the chutes 1a. The transport members 9 are interleaved between the transport members 4 and are of the same construction, having corresponding vertical inclined and bottom sides, 9a, 9b and 9c, respectively. The transport members 9 are separated from the transport members 4 by the cross strips 2 which define the limits between which the transport members can be reciprocated. The upwardly facing surfaces of the slides 3 are slightly undercut to permit the transport members 9 to lie flat against the surface of the support 1. The transport members 9 are similar to the transport members 4, and operate in the same manner. The slides 3 and the slides 8 are interconnected by yokes 5 and 10, respectively.

A hydraulic piston motor having piston rods 6 and 11 which engage the yokes 5 and 10 respectively is mounted on the plate 1 for reciprocation of the slide members 3 and 8. The two pistons in the hydraulic motor 7 have the same stroke length but are synchronized to move in opposite directions and to reverse directions of movement at the same time. In this manner one of the arrays of transport members 4 and 9 is always moving rearwardly, and one forwardly at the same time. Due to the configuration of the transport members, this reciproca-tion advances the particulate material forward on the support in a uniform manner, the forwardly facing vertic surfaces 4a and 9a of the transport members push the material forward. When the transport members move backward, there is little or no tendency for backward movement of the material to occur, due to the sloping surfaces on the transport members which slip beneath the material. The cross strips 2 due to their configuration also permit material to be advanced over their rearwardly facing sloping sides 2b, but restrain any backward movement at their vertical sides 2a. Moreover, since when one set of transport members moves backward, the other set of transport members moves forward further resistance to backward movement is provided by the forwardly moving transport members. As indicated above, the combination of opposed arrays transport members and the cross strips provides the best results.

In operation, the hydraulic motor is actuated and the two arrays transport members are oppositely reciprocated between the cross strips. The forward movement vertical surfaces of the first array of transport members cause the particulate material to be moved forward over the inclined surfaces of the cross strips. Upon return reciprocation, the inclined surfaces of the first, slide beneath the particulate material without moving it rearwardly. Any tendency for rearward movement of the particulate material is restrained by the vertical surfaces of the fixed cross strips and the forward movement of the second array of transport members. In this manner the particulate material is advanced in a uniform manner.

FIGS. 2 through 5 illustrate three arrangements of conveyors in a storage space, to deliver material to another conveyor. In these figures, the conveyor of the invention is designated 16, 16' and 16".

Figure 2:
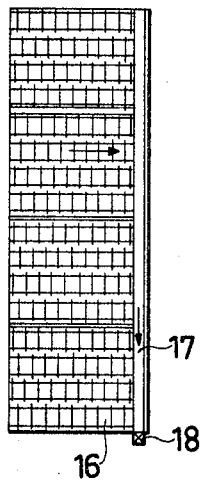
FIGS. 2 through 4 are schematic views of storage areas having several conveyors in accordance with this invention.

In the embodiment shown in FIG. 2, the storage area is provided with a plurality of conveyors 16, arranged in parallel, and each is adapted to discharge the particulate material onto a conveyor 17 at the side of the storage space, arranged at right angles thereto to pick up material from each of the conveyors. A vertical conveyor 18 is mounted at the discharge end of the conveyor 17, for conveying the particulate material to another level above the storage area. The conveyor 17 is a belt conveyor, but it can be a conveyor screw, a pneumatic conveyor or the like. Similarly, the conveyor 18 is a pneumatic conveyor, but it could be a bucket elevator, or similar conveying apparatus.

Figure 3:
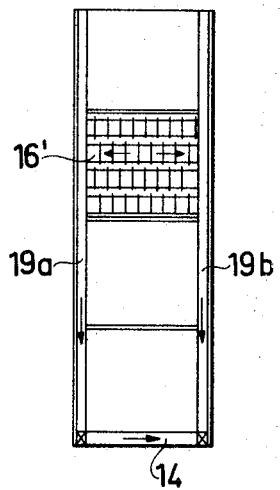

In FIG. 3, the storage area is provided with two conveyors 19a— 19b, extending along each side of the storage area, at right angles to a number of conveyors 16' of the invention. A transversely extending conveyor 14 is arranged at the discharge end of the conveyors 19a and 19b. The conveyors 16' are in two groups, which discharge the particulate material onto the conveyors 19a or 19b at each side of the storage space. The conveyors 19a and 19b in turn feed the material onto the conveyor 14.

Figure 4:
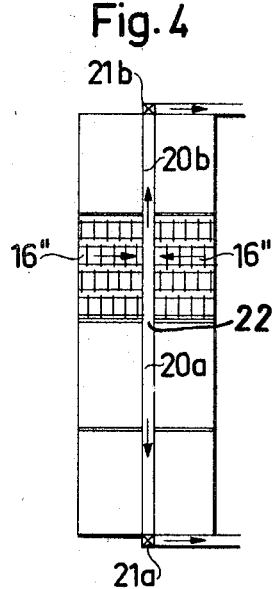
Figure 5:
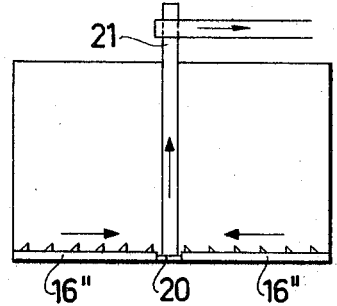
FIG. 5 is a view in cross section of the storage area shown in FIG. 4.

In FIGS. 4 and 5, two conveyors 20a and 20b are shown positioned centrally in the storage space, and running outwards from the center 22. The conveyors 20a and 20b are adapted to carry particulate material discharged from the conveyors 16" of the invention to opposite ends of the storage area onto conveyors 21a and 21b. In this embodiment, the conveyors 16" are in two sections on opposite sides of the centrally positioned conveyors 20a and 20b. Both sections are adapted to push the particulate material toward the center of the storage area, and onto the conveyors 20a and 20b. The conveyor 20a and 20b, deliver the material to the conveyors 21a and 21b, which raise the material to another level, about the storage space.

In FIG. 6, a trailer intended for transporting wood chips, wood shavings, powders or granular material is shown, incorporation a conveying apparatus in accordance with this invention, the trailer is intended to be coupled to a towing cab. The rear end of the vehicle 12 is provided with a discharge opening 13, which is in the same plane as the floor 14 of the cargo area. Mounted on the floor 14 is a conveyor 16″, as shown in FIG. 1. The conveyor advances the contents of the vehicle to the opening 13, through which they are discharged onto a conveyor or some other receiving means located beneath the opening.

The piston motor 7, as shown in FIGS. 6 and 7, is located behind the cargo space, on a stand 15 mounted beneath the level of the floor 14. The yokes 5 and 10 and the slides 3 and 8 are best seen by reference to FIG. 7, in which one of the two positions of the yokes is shown in broken lines and the other in solid lines.

The vehicle need not carry the drive means; suitable coupling mechanism can be provided, for connecting the conveyor to a power source at the loading station. If desired, each such system can be powered by a separate power source. As noted above, the storage area preferably has a flat floor, thereby utilizing the entire volume available.

Having regard to the foregoing disclosures, the following is claimed as the inventive and patentable embodiments thereof.

1. A conveyor comprising, in combination, a stationary conveyor support; a first array of reciprocable transport members on the conveyor support, reciprocable in a direction to advance a layer of particulate material along the support and to slip through the layer in the opposite direction, the transport members having at least two sides and a bottom, one side having a generally vertical surface, at an angle of at least 45° to the plane of the support, for pushing a layer of particulate material along the support, when the array is reciprocated in one direction, and another side having an inclined surface at an angle of less than 45° to the plane of the support, to slip through the layer of particulate material, when the array is reciprocated in the other direction; and an interleaved second array of reciprocable transport members along the support, mounted for reciprocable movement opposite to the first array such that when the first array of transport members are slipping through the layer the second array is advancing the layer.

2. A conveyor in accordance with claim 1, including an interleaved array of fixed retaining members on the support for restraining particulate material against movement when the arrays are slipping through the layer.

3. A conveyor in accordance with claim 2, in which the fixed retaining means comprise cross strips having a generally vertical surface facing in the direction of advance of material on the support, and inclined surface facing in the other direction.

4. A conveyor in accordance with claim 1, in which the transport members are reciprocated by a slide mechanism positioned at the sides or center of the support.

5. A conveyor in accordance with claim 4, in which the slide mechanism comprises a slide beam mounted in a guide.

6. A conveyor in accordance with claim 1, in which the transport members have a vertical surface defining an angle of approximately 90° to the plane of the support.

7. A conveyor in accordance with claim 1, in which the transport members of each array are reciprocated by a separate slide mechanism.

8. A storage area for holding particulate material until removed therefrom, comprising in combination, a storage space having walls for retaining a quantity of particulate material therein; and a conveyor in accordance with claim 1, positioned in the bottom thereof for discharging the material therefrom.

9. A storage area in accordance with claim 8, in which the storage is on a vehicle.

10. A storage area in accordance with claim 8, including a second conveyor for receiving the particulate material from the first conveyor.

References Cited

UNITED STATES PATENTS 2,592,010   4/1952   Cole et al. _____ 198—221 X

ALBERT J. MAKAY, Primary Examiner

U.S. Cl. X.R.

198—222; 222—409